UNITED STATES PATENT OFFICE.

HORACE W. BILLINGTON, OF JERSEY CITY, NEW JERSEY.

IMPROVEMENT IN LUBRICATING COMPOUNDS.

Specification forming part of Letters Patent No. 179,256, dated June 27, 1876; application filed June 6, 1876.

*To all whom it may concern:*

Be it known that I, HORACE W. BILLINGTON, of Jersey City, in the county of Hudson and State of New Jersey, have invented a new and Improved Lubricating Compound, of which the following is a specification:

My invention relates to that class of compounds which are used for lubricating the axles of wagons, street-cars, &c.; and it consists in the combination of a peculiar soap, made as hereinafter described, with London oil (rosin-oil, first run) and paraffine-oil.

I take of any animal grease, such as lard or tallow, two hundred pounds, and put it in a suitable iron kettle, and add to it about two barrels of water, and heat the mixture to a boiling-point by a jet of steam. I then add of caustic-soda lye, from 15° to 20° in strength, enough to thoroughly saponify the grease. After the saponification is completed, I add to the mixture, while boiling, about three pailfuls of coarse salt, to cause a separation between the saponified grease and the excess of water. After it is separated I withdraw the steam, and let the mixture stand for one-half hour. I then dish off the floating paste into frames to cool and harden. After being cooled I allow it to stand for two or three days, and then cut the mass into bars, dry them well, and then, by a suitable appliance, reduce the bars into thin shavings. I now take a close vessel, which can be heated by steam under pressure, and put therein one hundred pounds of London oil and fifty pounds of the soap-shavings, and heat them together until the soap is dissolved in the oil, and the mixture looks clear and translucent. I then withdraw the heat, and cool the mixture down nearly to blood-heat, and add fifty pounds of paraffine-oil, and mix all together with a wooden stirring-rod or mixer. I then run it off into boxes or packages to harden, when it is ready for use.

This compound will keep its state through all grades of weather, as the saponified matter will not melt except when broken or disturbed. It will not congeal or harden on cold iron when in use, nor will it gum or thicken. It is applicable to all kinds of axles.

If desired, this compound can be reduced to an oily consistency by lessening the quantity of saponified matter, when it is suitable for lubricating the axles of horse-cars and for other similar purposes.

Having thus described my invention, I claim as new and desire to secure by Letters Patent—

A lubricating compound consisting of saponified grease or soap, London oil, and paraffine-oil, combined in about the proportions and in the manner substantially as herein specified.

HORACE W. BILLINGTON.

Witnesses:
T. B. MOSHER,
ALEX. F. ROBERTS.